United States Patent
Shi et al.

(10) Patent No.: US 8,744,518 B2
(45) Date of Patent: Jun. 3, 2014

(54) MECHANISM FOR REDUCING TIME AWAY FROM PACKET SWITCHED OPERATION IN A SINGLE RADIO SOLUTION

(75) Inventors: Jianxiong Shi, Dublin, CA (US); Robert W. Mayor, Half Moon Bay, CA (US); Li Su, San Jose, CA (US); Zhu Ji, San Jose, CA (US); Thanigaivelu Elangovan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 13/617,135

(22) Filed: Sep. 14, 2012

(65) Prior Publication Data

US 2013/0267259 A1 Oct. 10, 2013

Related U.S. Application Data

(60) Provisional application No. 61/621,752, filed on Apr. 9, 2012.

(51) Int. Cl.
*H04M 1/00* (2006.01)
(52) U.S. Cl.
USPC .................. 455/552.1; 455/550.1; 455/456.6; 342/357.21
(58) Field of Classification Search
USPC ............. 455/552.1, 550.1, 456.6; 342/357.21
See application file for complete search history.

(56) References Cited

U.S. PATENT DOCUMENTS

| | | | |
|---|---|---|---|
| 6,522,871 B1 * | 2/2003 | Patrick et al. .................. 455/256 |
| 6,650,912 B2 | 11/2003 | Chen et al. | |
| 7,116,988 B2 * | 10/2006 | Dietrich et al. ............ 455/456.1 |
| 2002/0193108 A1 | 12/2002 | Robinett | |
| 2007/0063890 A1 * | 3/2007 | Yu .............................. 342/357.02 |
| 2009/0225662 A1 | 9/2009 | Tsai et al. | |
| 2010/0232351 A1 * | 9/2010 | Chansarkar et al. .......... 370/320 |
| 2010/0267410 A1 | 10/2010 | Chin et al. | |
| 2010/0283680 A1 * | 11/2010 | Vishin et al. ............. 342/357.63 |
| 2010/0296551 A1 | 11/2010 | Bhatia et al. | |
| 2011/0028166 A1 | 2/2011 | Ketchum et al. | |
| 2011/0060955 A1 | 3/2011 | Ludvigsen | |
| 2011/0116386 A1 | 5/2011 | Blanchard et al. | |
| 2011/0141895 A1 * | 6/2011 | Zhang ........................... 370/235 |
| 2012/0194387 A1 * | 8/2012 | Faragher ....................... 342/387 |
| 2012/0196622 A1 * | 8/2012 | Faragher .................... 455/456.1 |
| 2013/0158866 A1 * | 6/2013 | Weir et al. ..................... 701/468 |

OTHER PUBLICATIONS

International Search Report and Written Opinion in Application No. PCT/US2013/035238, mailed Jun. 21, 2013, pp. 1-10.

* cited by examiner

*Primary Examiner* — Danh Le
(74) *Attorney, Agent, or Firm* — Stephen J. Curran; Meyertons, Hood, Kivlin, Kowert & Goetzel, P.C.

(57) ABSTRACT

A single radio wireless communications device is contemplated in which the user equipment (UE) operates according to more than one radio access technology. The UE may operate preferentially according to a first radio access technology, and may switch to a different radio access technology at predetermined intervals to check for incoming calls. An error unit within the UE may provide frequency error estimates to a GPS unit during operation according to the first radio access technology based upon signals received in the first radio access technology, unless any time spent in the different radio access technology is longer that a predetermined duration. In response to the predetermined duration being met, the error unit may provide the frequency error estimation to the GPS unit based upon signals received in the different radio access technology.

21 Claims, 4 Drawing Sheets

MECHANISM FOR REDUCING TIME AWAY FROM PACKET SWITCHED OPERATION IN A SINGLE RADIO SOLUTION

PRIORITY CLAIM

The present application claims benefit of priority to U.S. Provisional Application No. 61/621,752 titled "Mechanism for Reducing Time Away from Packet Switched Operation in a Single Radio Solution" and filed on Apr. 9, 2012, whose inventors are Jianxiong Shi, Robert W. Mayor, Li Su, Zhu Ji, and Thanigaivelu Elangovan, and which is hereby incorporated by reference in its entirety.

BACKGROUND

1. Technical Field

This disclosure relates to wireless communication devices, and more particularly to frequency error estimation and single radio wireless devices implementing multiple wireless standards.

2. Description of the Related Art

In recent years, wireless devices such as smart phones and tablet computers have become increasingly sophisticated. In addition to supporting telephone calls, many wireless devices now provide access to the internet, email, text messaging, and navigation services using the global positioning system (GPS). Furthermore, because of the nearly continuous evolution and migration of wireless communication standards, many of these mobile devices are capable of operating within a number of radio access technologies and corresponding standards.

More particularly, some wireless devices may have necessity and the corresponding capability to switch operation between technologies for a variety of reasons such as the availability of a given technology in the current coverage area, or the operating mode of the wireless device, for example. However, depending on the available technology, the wireless device may have to operate under less than optimum conditions. For example, call quality, data transfer speed, GPS accuracy and/or availability may all be unacceptably reduced.

SUMMARY OF THE EMBODIMENTS

Various embodiments of a mechanism for reducing time away from packet switched operation in a single radio wireless solution are disclosed. Broadly speaking, a wireless communications device is contemplated in which the user equipment (UE) operates according to more than one radio access technology. The UE may be configured to operate preferentially according to a first one of the radio access technologies, and may switch to one or more of the other radio access technologies at predetermined intervals to check for incoming calls, for example. A frequency error unit within the UE may provide frequency error estimates to a GPS unit within the UE during operation according to the first radio access technology based upon signals received in the first radio access technology, unless any time spent in a given one of the other radio access technologies is longer that a predetermined duration. In response to the predetermined duration being met and/or exceeded, the frequency error unit may be configured to provide the frequency error estimation to the GPS unit based upon signals received in the given one of the other radio access technologies.

In one embodiment, the UE may include a receiver/transmitter unit configured to operate in a first mode according to a first radio access technology and a second mode according to a second radio access technology. The UE may also include a global positioning system (GPS) unit configured to provide navigation information based upon a received GPS signal. The UE may also include an error unit that may be configured to generate a first frequency error estimation based upon signals received during operation in the first mode, and to provide the first frequency error estimation to the GPS unit. The error unit may also be configured to generate a second frequency error estimation based upon signals received during operation in the second mode. In response to the receiver/transmitter unit operating in the second mode for greater than a predetermined amount of time, the error unit may provide the second frequency error estimation to the GPS unit.

In one specific implementation, the first radio access technology corresponds to a latest revision of a 3rd Generation Partnership Project (3GPP) long term evolution (LTE) wireless communication standard, and the second radio access technology corresponds to a code division multiplex 2000-1X (CDMA2000-1X) wireless communication standard, which is also referred to as an IS-2000 standard.

Figure 1:
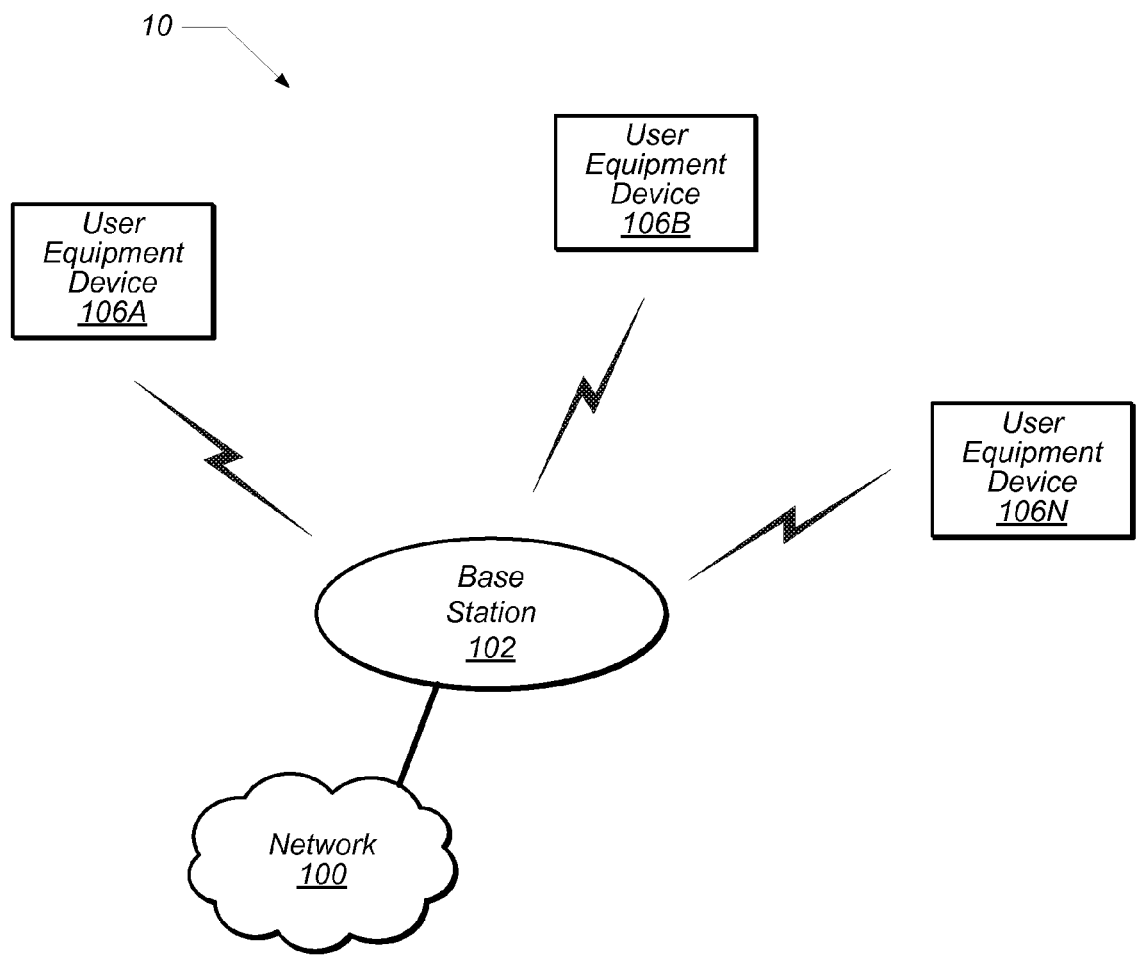
FIG. 1 is a block diagram of one embodiment of a wireless communication system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

As mentioned above, some wireless devices may have the capability to operate in a number of radio access technologies. Further, some devices may operate in a primary technology or standard, and operate in one or more additional technologies when the primary technology is unavailable, or the device selects a different technology. More particularly, as described further below a wireless device may operate in a radio access technology that is compliant with the $3^{rd}$ Generation Partnership Project (3GPP) Long Term Evolution (LTE) standard. As such, the wireless device may operate using an Internet Protocol (IP) using packet switched techniques. The wireless device may also operate in a radio access technology that is compliant with one or more versions of the older code division multiplex (CDMA) CDMA2000 standards such as the CDMA2000 1X (typically referred to as IS-2000) standard, for example. In this operational mode, the wireless device may operate using circuit switched techniques for both voice and data. For a variety of reasons including higher data rates, the wireless device may preferentially operate according to the LTE standard, and then seamlessly switch to the IS-2000 standard as necessary. For example, the wireless device may tune away from the LTE mode for short durations to monitor IS-2000 activity such as to check for incoming calls, for example.

However, to keep the tune away time to a minimum, many of these devices operate the IS-2000 timeline in what is known as the quick paging channel (QPCH) timeline whenever possible. The QPCH timeline refers to an alternative paging channel that transmits paging indicators rather than page messages. The time involved in demodulating the paging indicators of QPCH is much less than the time involved in demodulating a paging message.

To provide accurate GPS capability, wireless devices typically provide frequency error estimates to the GPS portion of the wireless device to compensate for frequency deviations between transmitted and received signals. Some conventional wireless devices generate the frequency error estimate information during operation in the IS-2000 timeline. However, these conventional devices typically inhibit the use of QPCH timeline for generating the frequency error estimate because, for example, the accuracy of frequency error estimates may be suspect in the QPCH timeline due in part to the short duration of the paging indicators. Thus, these conventional wireless devices may spend an unacceptable amount of time in the IS-2000 timeline. In the following embodiments of FIG. 1 through FIG. 4, a wireless communication system and device are described which may reduce the amount of time that they are tuned away from the LTE while still providing frequency error estimates to the GPS portion of the wireless device.

Turning now to FIG. 1, a block diagram of one embodiment of a wireless communication system is shown. It is noted that the system of FIG. 1 is merely one example of any of a variety of wireless communication systems. The wireless communication system 10 includes a base station 102 which communicates over a wireless transmission medium (as indicated by the zig-zag) with one or more user equipment (UE) devices (e.g., 106A through 106N). The base station 102 is also coupled a network 100 via another interface, which may be wired or wireless. It is noted that components identified by reference designators that include both a number and a letter may be referred to by the number only where appropriate.

The base station 102 may be a base transceiver station (BTS) or cell site, and may include hardware that enables wireless communication with one or more of the UEs 106. The base station 102 may also be equipped to communicate with the network 100. Thus, the base station 102 may facilitate communication between the UEs 106 and/or between the UEs 106 and the network 100. The communication area (or coverage area) of the base station 102 may be referred to as a "cell." In various embodiments, the base station 102 and the UEs may be configured to communicate over the transmission medium using any of various wireless communication radio access technologies such as LTE, GSM, CDMA, WLL, WAN, WiFi, WiMAX, etc.

In one embodiment, each of the UEs 106A-106N may be representative of a device with wireless network connectivity such as a mobile phone, a hand-held device, a computer or a tablet, or virtually any type of wireless device. As described further below, the UE 106 may include at least one processor (shown in FIG. 2) that is configured to execute program instructions stored in a memory (also shown in FIG. 2). Accordingly, in some embodiments, the UE 106 may perform one or more portions of the functionality described below by executing such stored instructions. However, in other embodiments, the UE 106 may include one or more hardware elements and/or one or more programmable hardware elements such as an FPGA (field-programmable gate array) that may be configured to perform the one or more portions the functionality described below. In still other embodiments, any combination of hardware and software may be implemented to perform the functionality described below.

As described further below in conjunction with the descriptions of FIG. 2 through FIG. 4, in some embodiments, portions of the UE 106 may be configured to generate frequency error estimates for use by one or more components such as a Global Positioning System (GPS) unit (e.g., GPS unit 205 of FIG. 2), for example, within the UE 106. In addition, as mentioned above the UE 106 may be configured to operate according to a number of radio access technologies and corresponding wireless communication standards. Thus, circuits within the UE 106 may be configured to selectively provide a particular frequency error estimate to the GPS unit depending upon the radio access technology within which the UE 106 is operating. More particularly, in one embodiment, the UE 106 may preferentially operate in one radio access technology, and thus provide frequency error estimates based upon that technology. However, if the UE 106 switches operation to another technology for a predetermined duration, the UE 106 may selectively provide frequency error estimates to, for example the GPS unit, based upon that switched-to technology.

Figure 2:
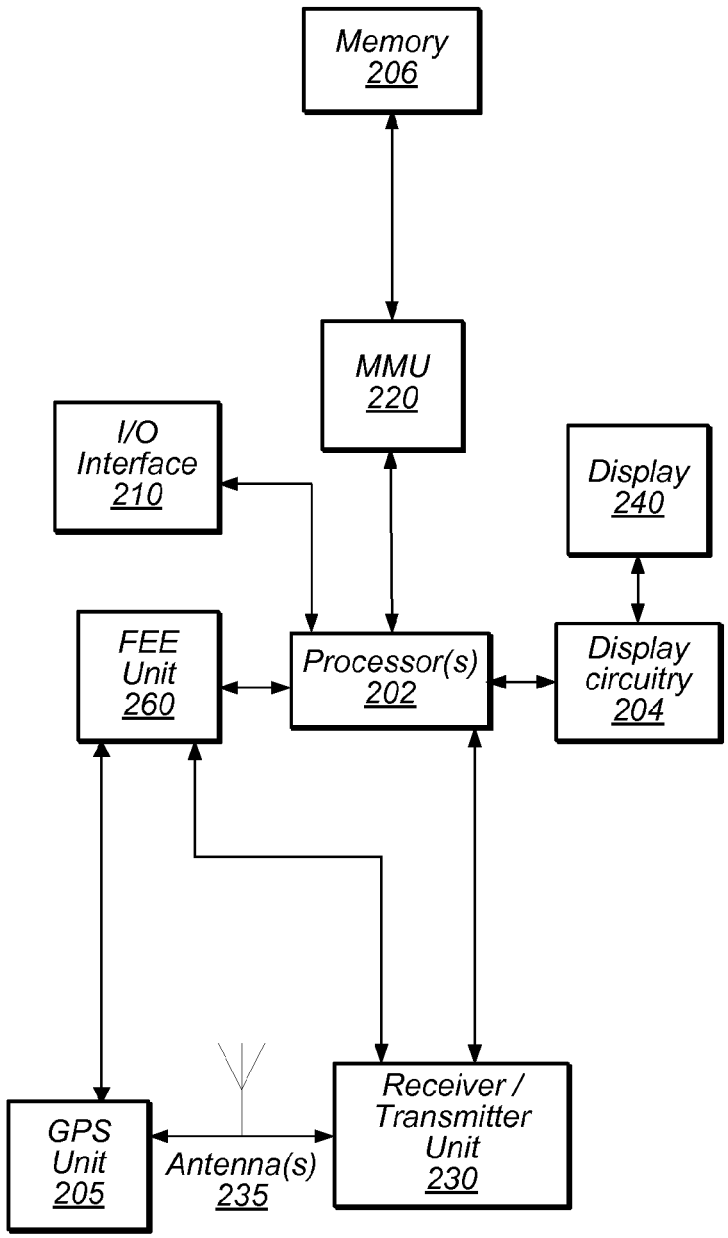
FIG. 2 is a block diagram of one embodiment of a wireless communication device shown in FIG. 1.

Referring to FIG. 2, a block diagram of one embodiment of a user equipment device shown in FIG. 1 is shown. It is noted that components that correspond to components shown in FIG. 1 are numbered identically for clarity and simplicity. The UE 106 includes processor(s) 202 (or processor core(s) 202) which is coupled to display circuitry 204 which is in turn coupled to the display 240. The processor(s) 202 is also coupled to a memory management unit (MMU) 220. The processor(s) 202 is further coupled to a receiver/transmitter (R/T) unit 230 and to a frequency error estimation (FEE) unit 260 which is in turn coupled to the GPS unit 205. The MMU 220 is coupled to a memory 206. The UE 106 also includes an I/O interface 210 that is coupled to the processor(s) 202, and may be used for coupling the UE 106 to a computer system, or other external device. It is noted that in one embodiment the components shown within UE 106 of FIG. 2 may be manufactured as stand alone components. However, it is contemplated that in other embodiments various ones of the components may be part of one or more chipsets that may include a system on chip (SOC).

In various embodiments, the processors 202 may be representative of a number of different types of processors that may be found in a wireless communications device. For example, processor(s) 202 may include general processing capability, digital signal processing capability, as well as hardware accelerator functionality, as desired. The processor(s) 202 may include baseband processing and therefore may digitally process the signals received by the R/T unit 230. The processor(s) 202 may also process data that may be transmitted by the R/T unit 230. The processor(s) 202 may also perform a number of other data processing functions such as running an operating system and user applications for the UE 106.

In one embodiment, the MMU 220 may be configured to receive addresses from the processor(s) 202 and to translate those addresses to locations in memory (e.g., memory 206) and/or to other circuits or devices, such as the display circuitry 204, R/T unit 230, and/or display 240. The MMU 220 may be configured to perform memory protection and page table translation or set up. In some embodiments, the MMU 220 may be included as a portion of the processor(s) 202. The display circuit 204 may be configured to perform graphics processing and provide display signals to the display 240.

The R/T unit 230 may, in one embodiment, include analog radio frequency (RF) circuitry for receiving and transmitting RF signals via the antenna 235 to perform the wireless communication. The R/T unit 230 may also include down-conversion circuitry to lower the incoming RF signals to the baseband or intermediate frequency (IF) as desired. For example, the R/T unit 230 may include various RF and IF filters, local oscillators, mixers, and the like. Since the UE 106 may operate according to a number of radio access technologies, the R/T unit 230 may include a corresponding number of RF front end portions to receive and down-convert, as well as up-convert and transmit the respective RF signals of each technology. For example, in one specific implementation, the R/T unit 230 may include an LTE front end and an IS-2000 front end.

In various embodiments, the GPS unit 205 may generate information that may be used in a variety of applications. For example, the GPS unit may receive from the antenna 235 both satellite and/or terrestrial-based signals that correspond to time of day, elevation, latitude and longitude, for example. Thus, the current location of the UE 106 as well as other locations may be generated, which may be subsequently used for navigation and mapping, as well as other applications, as desired.

In one embodiment, the FEE unit 260 may be configured to determine the frequency error between one or more components (e.g., pilot signal) of a received signal and the frequency of a corresponding local oscillator associated with the R/T unit 230. The FEE unit 260 may calculate an estimate of the frequency error and provide the estimate information to the GPS unit 205 as well as other circuits and processes in the UE 106. More particularly, in various embodiments, the frequency error estimate information may be used by rotator circuits to correct received samples using frequency translation. In addition, the frequency error estimate information may be used to correct the local oscillator frequency. As described in greater detail below, in one embodiment the FEE unit 260 may include more than one estimation unit so that frequency error estimates may be made while operating according to different radio access technologies. For example, in one embodiment, the FEE 260 may be configured to generate frequency error estimates for the LTE timeline and frequency error estimates for the IS-2000 timeline, while in other embodiments, FEE unit 260 may be configured to generate frequency error estimates for other access technologies. The FEE unit 260 may provide the appropriate frequency error estimate based upon which of the timelines within which the UE 106 is operating. It is noted that although the FEE unit 206 is shown in FIG. 2 as a separate unit, it is contemplated that in other embodiments, the FEE unit 260 may be a part of the processors 202, or other circuit blocks such as the R/T unit 230, as desired.

Figure 3:
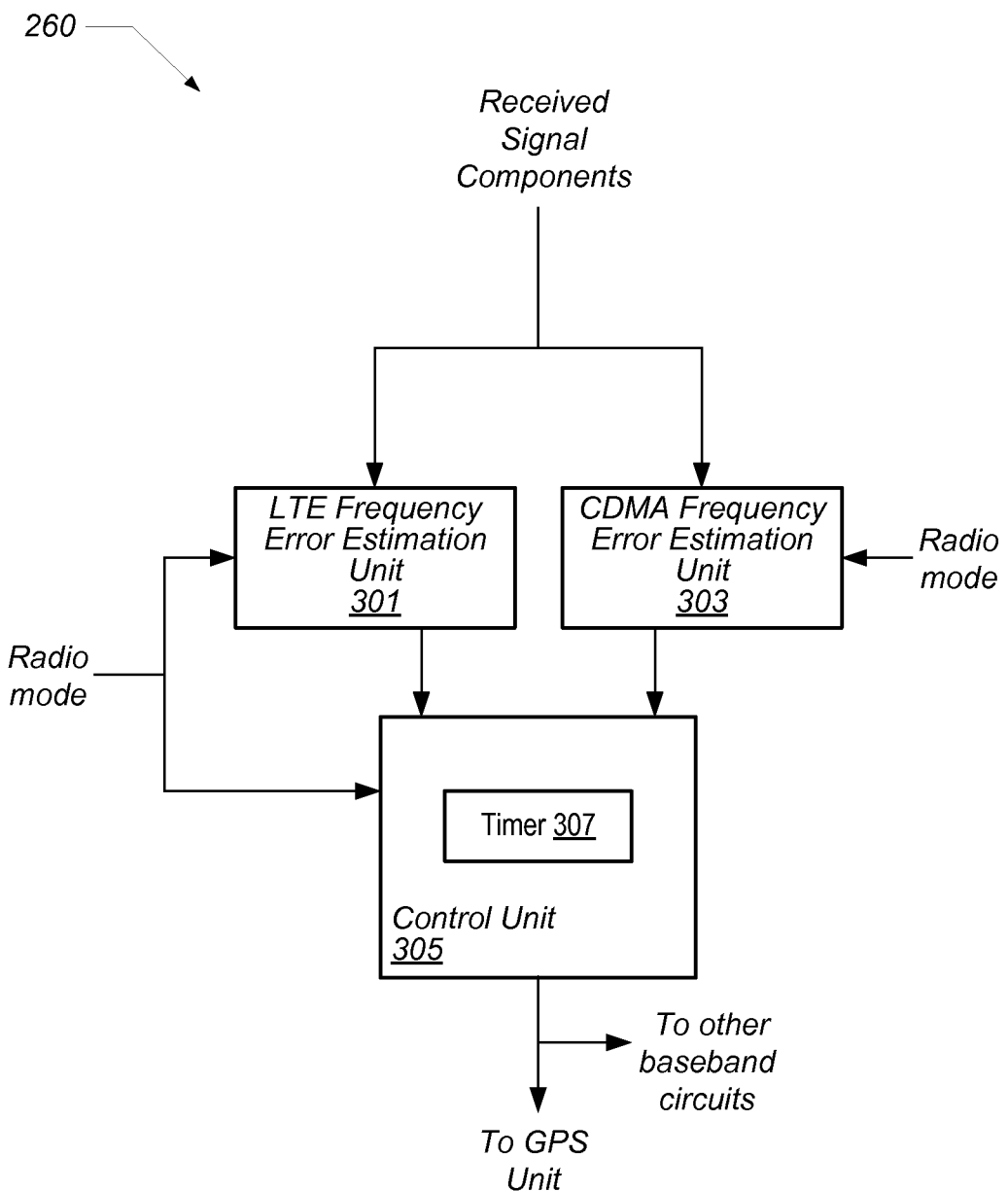
FIG. 3 is a block diagram of one embodiment of a frequency error unit of the wireless communication device of FIG. 2.

Turning to FIG. 3, a block diagram of one embodiment of a frequency error estimation unit of the wireless user equipment device of FIG. 2 is shown. It is noted that components that correspond to components shown in FIG. 2 are numbered identically for clarity and simplicity. The FEE unit 260 includes an LTE frequency error estimation (LFEE) unit 301 and a CDMA frequency error estimation (CFEE) unit 303, both of which are coupled to a control unit 305. The control unit 305 is coupled to provide frequency error estimates to the GPS unit as shown. The LFEE unit 301 and the CFEE unit 303 are coupled to receive signal information from the R/T unit 230.

In one embodiment, the LFEE unit 301 and the CFEE unit 303 may use signal information such as the received pilot or carrier signal of their respective radio access technology, and frequency information from the local oscillator with the RF unit 230 to determine an estimate of the frequency error. The frequency error estimate values may be different depending on which radio access technology is being used. Thus, the control unit 305 may select one of the frequency error estimates based at least in part on the radio mode signal, and provide the error estimate to the GPS unit 205. More particularly, the radio mode signal may be in one state when the UE 106 is operating according in the LTE timeline, and the radio mode signal may be in another state when the UE 106 is operating according in the IS-2000 timeline. Thus, as described in greater detail below in conjunction with the description of FIG. 4, in response to the radio mode signal, the control unit 305 may select which frequency error estimate to send to the GPS unit 205 and other circuits. In one embodiment, the control unit 305 may include hardware timing circuits (e.g., timer 307) that track how long the UE 106 is operating in the IS-2000, so that the control unit 305 may determine when (if at all) to switch to using the frequency error estimate from the CFEE unit 303, for example. However, in other embodiments, the radio mode signal may be an encoded signal that includes information to cause the control unit 305 to switch between the CFEE 303 and the LFEE 301.

In one embodiment, as mentioned above, if the received signal strength is sufficient for operation in the QPCH timeline during the tune away mode, the control unit 305 may inhibit the CFEE unit 303 from providing the frequency error estimate so that the R/T unit 230 may switch back to operation in the LTE timeline as soon as possible. Otherwise, if the CFEE unit 303 were not prevented from providing the frequency error estimate, the R/T unit 230 may stay in the IS-2000 timeline longer than is desirable so that the CFEE unit 303 may provide the frequency error estimates to the GPS unit 205. It is noted that there is a particular duration between the frequency error estimates that were provided by the LTE timeline prior to switching to the QPCH timeline. Thus, if that duration is not exceeded, for example, the GPS unit 205 may not necessarily need an error estimate from the CFEE unit 303 before the next scheduled error estimate by the LFEE unit 301. Thus, only if the R/T unit 230 stays in the IS-2000 timeline longer than a predetermined amount of time, will the control unit 305 allow the CFEE unit 303 to provide the frequency error estimate to the GPS unit 205.

In addition, in one embodiment, each of the LFEE unit 301 and the CFEE unit 303 may be disabled and/or powered down when not used. For example, in one embodiment, power gating or clock gating may be implemented so that in response to appropriate transitions the radio mode signal, those circuits may either be disabled or powered down.

Figure 4:
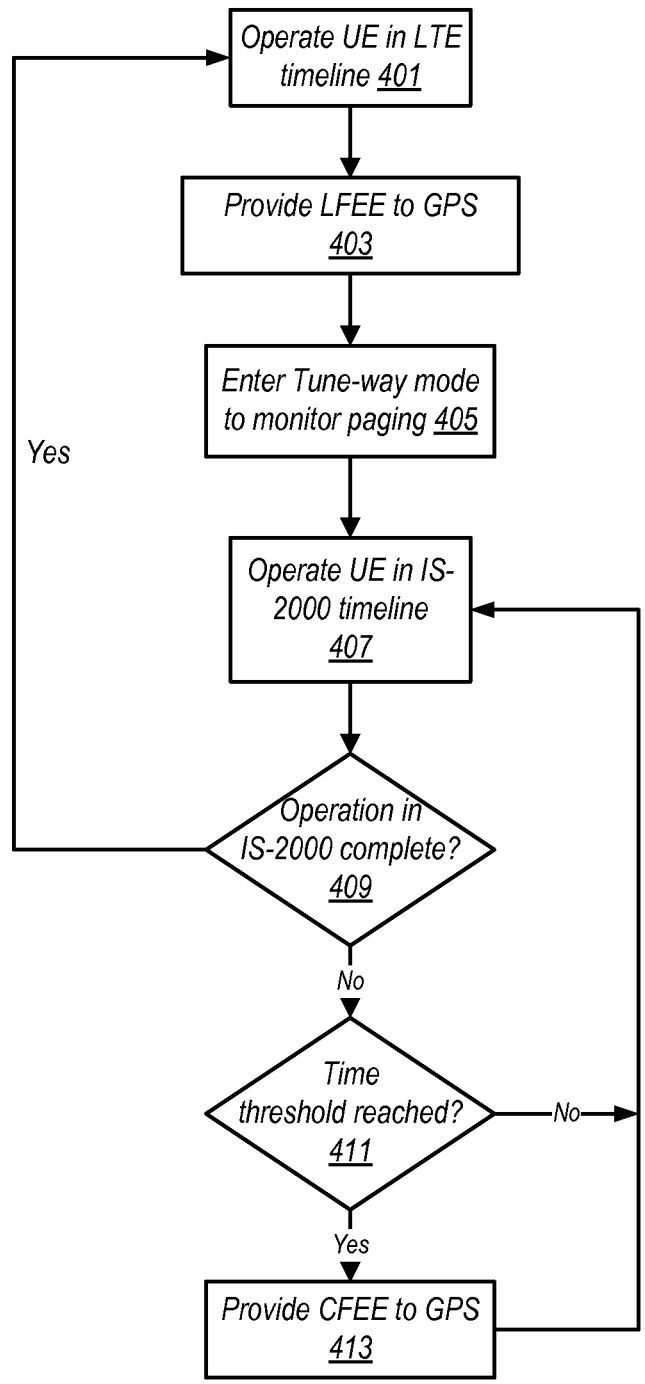
FIG. 4 is a flow diagram depicting the operation of one embodiment of the frequency error unit shown in FIG. 2 and FIG. 3.

In FIG. 4, a flow diagram depicting the operation of one embodiment of the frequency error estimation unit shown in FIG. 3 is shown. Referring collectively to FIG. 1 through FIG. 4 and beginning in block 401 of FIG. 4, the UE 106 may be operating in the LTE timeline. As such, the LFEE unit 301 may calculate the frequency error estimates based upon, for example, the received LTE pilot signal as described above. More particularly, the radio mode signal may indicate that the UE 106 is operating in the LTE timeline. Accordingly, the control unit 305 may report the frequency error estimate generated by the LFEE 301 to the GPS unit 205 (block 403). In one embodiment, since the UE 106 is operating in the LTE timeline, the radio mode signal may cause the CFEE unit 303 to either power down or be disabled to reduce power consumption and switching noise.

During operation in the LTE timeline, the UE 106 may, at predetermined or other intervals, tune away from the LTE timeline to monitor IS-2000 paging activity (e.g., check for any incoming IS-2000 calls or data activity) (block 405). For example, in one embodiment, the UE 106 may operate in the QPCH timeline to check for QPCH indicators, or the UE 106 may operate in the IS-2000 timeline to check for paging messages.

Accordingly, the UE 106 may switch to operation in the IS-2000 timeline (block 407). More particularly, the various circuits in the R/T unit 230 may switch to receive the IS-2000 information. In addition, the radio mode signal may transition to indicate operation in the IS-2000 timeline. Accordingly, in one embodiment, the radio mode signal may cause the LFEE unit 301 to be inhibited and the CFEE unit 303 to be enabled and to begin calculating the frequency error for the IS-2000 timeline. It is noted that in the tune-away mode, if the signal strength allows for the QPCH timeline and there are no incoming calls, the time spent away from the LTE timeline may be relatively short. Thus, the control unit 305 may continue to inhibit the frequency error estimate calculated by the CFEE unit 303 from being provided to the GPS unit 205.

If operation in the IS-2000 timeline is complete (block 409), then the CFEE unit 303 may be disabled and operation returns to the LTE timeline as described above in conjunction with block 401. However, if operation in the IS-2000 timeline is not complete (block 409), the control unit 305 may begin tracking how much time is spent in the IS-2000 timeline. As described above, the control unit 305 may include timer units to track the duration of time operating in the IS-2000 timeline. Alternatively, software executing in processor(s) 202 may keep track of the time operating in the IS-2000 timeline, and provide specific encodings via the radio mode signal to the control unit 305. In either case, if a predetermined time threshold has not been met (block 411), operation continues in the IS-2000 timeline as described above in conjunction with block 407.

However, if a predetermined time threshold has been met (block 411), the control unit 305 may report the frequency error estimates from the CFEE unit 303 to the GPS unit 205 (block 413). By providing the frequency error estimate from the CFEE unit based upon the IS-2000 signals, the accuracy of the GPS unit 205 may be maintained. Operation continues in the IS-2000 timeline as described above in block 407.

Accordingly, by allowing the UE 106 to operate preferentially in the LTE timeline, and only providing frequency error estimates to the GPS unit based upon IS-2000 timeline when the UE 106 must operate in the IS-2000 for longer than some predetermined duration, the performance of the UE 106 may be improved.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless mobile device comprising:
a receiver/transmitter unit configured to operate in a first mode according to a first radio access technology and a second mode according to a second radio access technology;
a global positioning system (GPS) unit configured to provide navigation information based upon a received GPS signal; and
an error unit configured to generate a first frequency error estimation based upon signals received during operation in the first mode and to provide the first frequency error estimation to the GPS unit;
wherein the error unit is further configured to generate a second frequency error estimation based upon signals received during operation in the second mode; and
wherein in response to the receiver/transmitter unit operating in the second mode for greater than a predetermined amount of time, the error unit is configured to provide the second frequency error estimation to the GPS unit.

2. The wireless mobile device of claim 1, wherein the first radio access technology corresponds to a latest revision of a 3rd Generation Partnership Project (3GPP) long term evolution (LTE) wireless communication standard.

3. The wireless mobile device of claim 1, wherein the second radio access technology corresponds to a code division multiplex 2000-1X (CDMA2000-1X) wireless communication standard.

4. The wireless mobile device of claim 1, wherein the receiver/transmitter unit is configured to preferentially operate in the first mode and to switch to operation in the second mode at predetermined intervals.

5. The wireless mobile device of claim 4, wherein the receiver/transmitter unit is configured to remain in the second mode in response to detection of a weak signal in the second radio access technology.

6. The wireless mobile device of claim 4, wherein the error unit comprises a control unit configured to determine whether the receiver/transmitter unit is operating in the second mode for greater than the predetermined amount of time.

7. A method comprising:
a wireless mobile device receiving signals while operating in a first mode according to a first radio access technology and receiving signals while operating in a second mode according to a second radio access technology;

a global positioning system (GPS) unit of the wireless mobile device providing navigation information;

generating a first frequency error estimation based upon first signals received during operation in the first mode, and providing the first frequency error estimation to the GPS unit; and generating a second frequency error estimation based upon second signals received during operation in the second mode;

wherein in response to receiving signals in the second mode for greater than a predetermined amount of time, providing the second frequency error estimation to the GPS unit.

8. The method as recited in claim 7, wherein the first radio access technology corresponds to a latest revision of a 3rd Generation Partnership Project (3GPP) long term evolution (LTE) wireless communication standard.

9. The method as recited in claim 7, wherein the second radio access technology corresponds to a code division multiplex 2000-1X (CDMA2000-1X) wireless communication standard.

10. The method as recited in claim 7, wherein the first and second signals correspond to first and second pilot signals.

11. The method as recited in claim 7, wherein receiving signals while operating in the second mode includes switching to operation in the second mode at predetermined intervals and checking for incoming messages.

12. The method as recited in claim 11, further comprising returning to operation in the first mode in response to determining that there are no incoming messages.

13. A method comprising:

operating a wireless mobile device in a first mode according to a first radio access technology for a first duration;

generating a first frequency error estimation based upon signals received during operation in the first mode, and providing the first frequency error estimation to a Global Positioning System (GPS) unit;

operating the wireless mobile device in a second mode according to a second radio access technology for a second duration at predetermined intervals of time, and in response to receiving an incoming message; and generating a second frequency error estimation based upon signals received during operation in the second mode;

wherein in response to operating the wireless mobile device in the second mode for greater than a predetermined amount of time, providing the second frequency error estimation to the GPS unit.

14. The method as recited in claim 13, wherein operating the wireless mobile device in a second mode includes checking for incoming messages.

15. The method as recited in claim 13, further comprising returning to operation in the first mode in response to determining that there are no incoming messages.

16. The method as recited in claim 13, wherein the predetermined amount of time corresponds to an amount of time that is less than the first duration.

17. A wireless mobile device comprising:

a receiver/transmitter unit configured to operate in a first mode according to a first radio access technology, and to operate in a second mode according to a second radio access technology;

a global positioning system (GPS) unit configured to provide navigation information based upon a received GPS signal;

an error unit configured to generate a first frequency error estimation based upon signals received during operation in the first mode and to provide the first frequency error estimation to the GPS unit, and to generate a second frequency error estimation based upon signals received during operation in the second mode;

wherein the error unit is further configured to inhibit providing the second frequency error estimation to the GPS unit until a predetermined amount of time has elapsed while operating in the second mode.

18. The wireless mobile device of claim 17, wherein the first radio access technology corresponds to a latest revision of a 3rd Generation Partnership Project (3GPP) long term evolution (LTE) wireless communication standard.

19. The wireless mobile device of claim 17, wherein the second radio access technology corresponds to a code division multiplex 2000-1X (CDMA2000-1X) wireless communication standard.

20. The wireless mobile device of claim 17, wherein in response to the predetermined amount of time elapsing and the receiver/transmitter unit continues to operate in the second mode, the error unit is configured to provide the second frequency error estimation to the GPS unit.

21. The wireless mobile device of claim 17, wherein the error unit includes a control unit configured to determine whether the predetermined amount of time has elapsed.

* * * * *